United States Patent
Carswell

(10) Patent No.: US 10,448,254 B2
(45) Date of Patent: Oct. 15, 2019

(54) SYSTEMS AND METHODS FOR WIRELESS COMMUNICATION IN FREQUENCY-LIMITED, CLIENT-DENSE ENVIRONMENTS

(71) Applicant: Systems and Software Enterprises, LLC, Brea, CA (US)

(72) Inventor: Samuel A. Carswell, Yorba Linda, CA (US)

(73) Assignee: SYSTEMS AND SOFTWARE ENTERPRISES, LLC, Brea, CA (US)

( * ) Notice: Subject to any disclaimer, the term of this patent is extended or adjusted under 35 U.S.C. 154(b) by 0 days.

(21) Appl. No.: 15/012,802

(22) Filed: Feb. 1, 2016

(65) Prior Publication Data

US 2016/0227415 A1    Aug. 4, 2016

Related U.S. Application Data

(60) Provisional application No. 62/109,681, filed on Jan. 30, 2015.

(51) Int. Cl.
*H04W 16/10* (2009.01)
*H04B 7/185* (2006.01)
(Continued)

(52) U.S. Cl.
CPC ........ *H04W 16/10* (2013.01); *H04B 7/18506* (2013.01); *H04W 84/12* (2013.01);
(Continued)

(58) Field of Classification Search
CPC ........ B29C 2045/1687; B29C 37/0028; B29C 37/0053; B29C 45/0046; B29C 45/1679;
(Continued)

(56) References Cited

U.S. PATENT DOCUMENTS 7,016,649 B1 * 3/2006 Narasimhan ........... H01Q 1/246
455/552.1
7,483,696 B1 * 1/2009 Mitchell ............ H04B 7/18508
455/427

(Continued)

FOREIGN PATENT DOCUMENTS

WO    2008029053 A2    3/2008

OTHER PUBLICATIONS

Ziegler, Volker, et al. "Broadband 57-64-GHz WLAN Communication System Integrated Into an Aircraft Cabin." IEEE Transactions on Microwave Theory and Techniques, vol. 60, No. 12, 2012, pp. 4209-4219.

(Continued)

*Primary Examiner* — Huy D Vu
*Assistant Examiner* — Nizam U Ahmed
(74) *Attorney, Agent, or Firm* — Umberg Zipser LLP; Ryan S. Dean

(57) ABSTRACT

A system for managing the wireless transmission of data using a configured or fixed frequency, such as the 60 GHz spectrum, within a client-dense environment such as an aircraft. The system includes access points ("ZAPs") that control a plurality of antennas according to a time-slotted broadcast schedule such that the transmissions from the antennas do not interfere with each other.

9 Claims, 7 Drawing Sheets

(51) Int. Cl.
*H04W 84/12* (2009.01)
*H04W 88/08* (2009.01)
*H04W 84/00* (2009.01)
*H04W 36/06* (2009.01)
*H04W 36/30* (2009.01)

(52) U.S. Cl.
CPC .......... *H04W 88/085* (2013.01); *H04W 36/06* (2013.01); *H04W 36/305* (2018.08); *H04W 84/005* (2013.01)

(58) Field of Classification Search
CPC .............. B29C 67/246; B29K 2023/00; B29K 2025/00; B29K 2027/06; B29K 2059/00; B29K 2067/00; B29K 2069/00; B29L 2031/3005
USPC .......................................................... 370/336
See application file for complete search history.

(56) References Cited

U.S. PATENT DOCUMENTS

| 8,031,650 | B2 | 10/2011 | Petite | |
|---|---|---|---|---|
| 2004/0142658 | A1* | 7/2004 | McKenna | H01Q 1/007 455/11.1 |
| 2007/0155314 | A1* | 7/2007 | Mohebbi | H04B 7/15507 455/11.1 |
| 2008/0316986 | A1* | 12/2008 | Snyder | H04W 16/26 370/338 |
| 2009/0098838 | A1* | 4/2009 | Guo | H04B 7/0426 455/101 |
| 2009/0307740 | A1* | 12/2009 | Keidar | H04H 20/426 725/118 |
| 2011/0110340 | A1 | 5/2011 | Lakkis | |
| 2011/0128949 | A1 | 6/2011 | Ezaki | |
| 2011/0170522 | A1* | 7/2011 | Liao | H04W 72/046 370/336 |
| 2012/0213149 | A1* | 8/2012 | Chakraborty | H04W 52/365 370/328 |
| 2016/0056868 | A1* | 2/2016 | Adachi | H04W 52/0206 370/329 |

OTHER PUBLICATIONS

Luo, Jian, et al. "A Design Concept for a 60 GHz Wireless In-Flight Entertainment System." 2008 IEEE 68th Vehicular Technology Conference, 2008.
Peter, Michael, et al. "A Survey on 60 GHz Broadband Communication: Capability, Applications and System Design." 2008 European Microwave Integrated Circuit Conference, 2008.

* cited by examiner

SYSTEMS AND METHODS FOR WIRELESS COMMUNICATION IN FREQUENCY-LIMITED, CLIENT-DENSE ENVIRONMENTS

This application claims priority to U.S. provisional application 62/109,681, filed Jan. 30, 2015. U.S. provisional application 62/109,681 and all other extrinsic references contained herein are incorporated by reference in their entirety.

FIELD OF THE INVENTION

The field of the invention is wireless networking in frequency-limited environments populated with a high density of clients and potentially a high density of access points, such as for in-flight entertainment systems.

BACKGROUND

The background description includes information that may be useful in understanding the present invention. It is not an admission that any of the information provided herein is prior art or relevant to the presently claimed invention, or that any publication specifically or implicitly referenced is prior art.

Providing in-flight entertainment is an important component of air travel, and as technology has advanced, available options for in-flight entertainment have expanded. Wireless networking has opened the door to many different modes of entertainment delivery in in-flight entertainment systems.

However, within the confines of an aircraft or other vehicle there exists a limited amount of unlicensed, unrestricted available bandwidth within the commonly adopted spectrums (e.g., WiFi, cellular, etc.). As the amount of network-capable devices both within an aircraft and carried on by passengers increases, the amount of bandwidth for reliable delivery of content decreases.

The 60 GHz spectrum provides an alternative to the WiFi and cellular bands that allows for very fast data transfers, but it is subject to very severe attenuation by air and as such, has very limited range. Additionally, it is very sensitive to disruption by obstacles and other environment factors, requiring line-of-sight communications. As such, the 60 GHz spectrum has traditionally not been suitable for crowded environments such as the inside of an aircraft.

Additionally, as available bandwidth within an aircraft becomes increasingly reserved or otherwise restricted, the available frequencies for transmission become limited and frequency-hopping to resolve transmission conflicts may not be available as an option. However, in an environment having many access points and many clients, there exists a high potential for interference among devices transmitting on the same frequency band, thus disrupting communications.

Thus, there still exists a need for improved in-flight wireless networking solutions for the distribution of information to airline Passenger Electronic Devices (PEDs) and aircraft equipment.

SUMMARY OF THE INVENTION

The inventive subject matter provides apparatus, systems and methods in which an in-vehicle entertainment system can transmit data wirelessly and efficiently within the crowded environment of a vehicle cabin using a configurable frequency band. The systems and methods of the inventive subject matter takes advantage of the diffusive qualities of the 60 GHz frequency bands to enable the high-speed transfer of data within the crowded environment using a plurality of access point antennas to communicate with a plurality of densely-spaced clients.

An access point device, referred to herein as a "ZAP", controls the transmission of a plurality of its antennas such that the antennas transmit according to a fixed time slot broadcast schedule, whereby two antennas within transmission range of one another do not transmit at the same time. The antennas and the client devices all transmit using the performed within the 57-66 GHz frequency range, and more preferably within the 61.56 to 62.9 GHz ISM band. Thus, the ZAP ensures that adjacent antennas transmit at different times such that their transmissions do not interfere with each other.

The ZAP causes the antennas to transmit content (e.g., movies, television shows, etc.) to client devices connected to or integrated with in-flight entertainment devices ("IFEs"), such as those installed in aircraft seat-backs, that can receive content for playback on the IFEs.

The client devices can select an antenna for use based on the current conditions within the cabin. Thus, a client device that has a data transmission from a first antenna interrupted by an environmental factor (such as by a passenger moving about the cabin, a service cart coming down the cabin, or other obstacle that causes a break in the transmission) can request to use a different antenna to resume receiving data. The client devices can request a new antenna from the ZAP upon learning of the disruption.

The ZAPs also manage the time slots such that the client devices have available slots to broadcast back to the ZAP without causing interference with the broadcasts from the antennas. Thus, the client devices can exchange data with the ZAPs as needed, such as to switch antennas, report information to the ZAPs (e.g., usage information, diagnostic information, flight attendant call requests, etc.).

The presented innovation for communicating with installed aircraft equipment clients such as seats, galley, lighting, lavatory and carts. Simultaneous individual client file download and multiple-client streaming of data are delivered with a bit rate and quality of service in excess of that could otherwise be realized within the restricted available spectrum.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
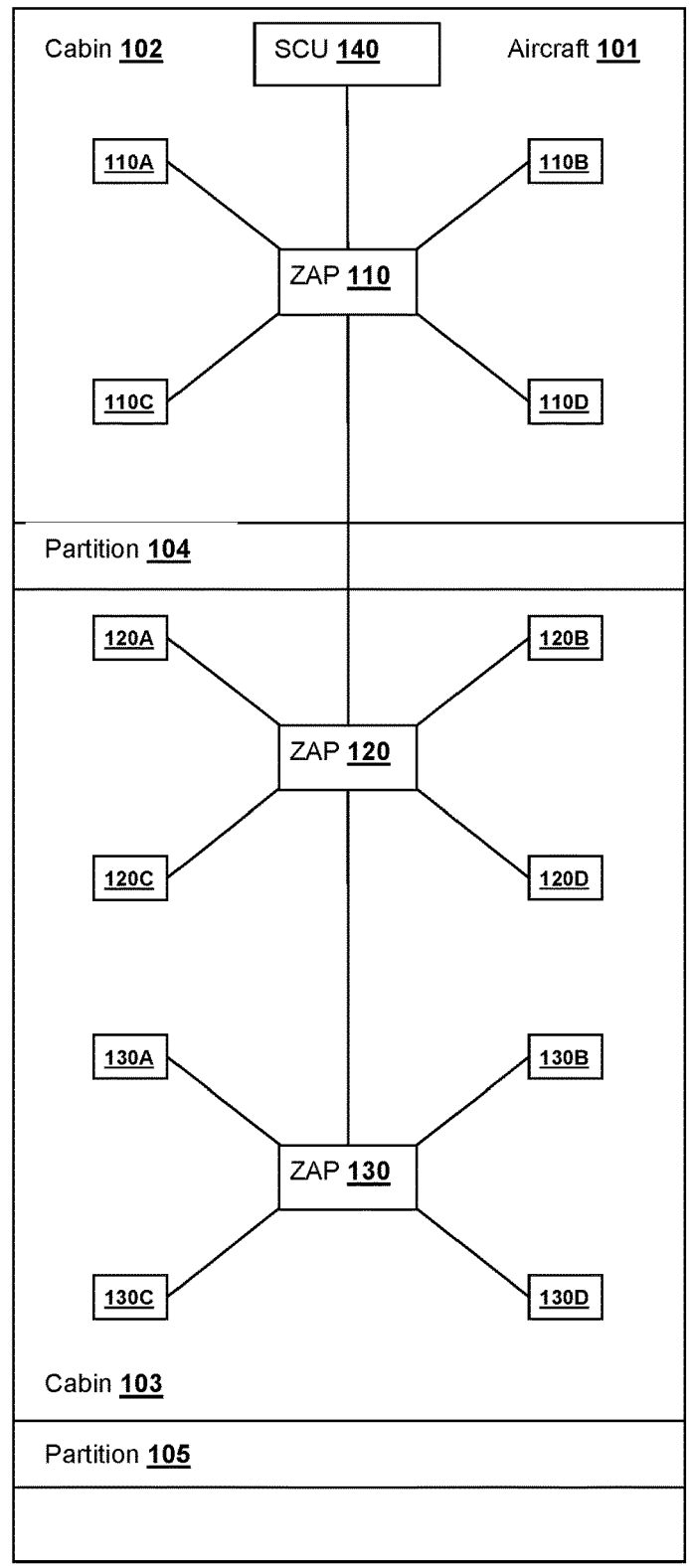
FIG. 1 provides an illustrative example of a cabin layout of aspects of the system installed in an aircraft from a top-down perspective.

The following description includes information that may be useful in understanding the present invention. It is not an admission that any of the information provided herein is prior art or relevant to the presently claimed invention, or that any publication specifically or implicitly referenced is prior art.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

One should appreciate that the systems and methods of the inventive subject matter provide the technical effect of enabling reliable wireless transmissions between many access point antennas and many clients all transmitting within a crowded environment, such as an aircraft or other large passenger vehicle, on a restricted frequency band. The systems and methods of the inventive subject matter provide the additional technical effect of enabling the use of the 60 GHz spectrum for communications in such an environment.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The systems and methods of the inventive subject matter enable efficient, fast and reliable wireless communication between access points and clients in fixed-frequency band operation within the confines of an obstruction- and/or interference-filled environment such as the interior of a passenger aircraft or other vehicle.

FIG. 1 provides an illustrative example of a cabin layout of aspects of the system 100 installed in an aircraft 101 from a top-down perspective (i.e., looking down from above the aircraft 101), according to embodiments of the inventive subject matter.

As shown in FIG. 1, system 100 includes at least one access point 110. In the illustrated example of FIG. 1, the system 100 includes access points 120, 130, and it is contemplated that the system 100 can include additional access points. To avoid confusion with wireless access points of conventional wireless access points (e.g., cellular, WiFi), the access points 110, 210, 310 of the inventive subject matter will be referred to herein as "ZAPs". Each ZAP 110, 120, 130 is communicatively coupled via a wired data connection with a plurality of antennas 110A-110D, 120A-120D, and 130A-130D, respectively.

Each antenna is separated by several meters thus giving the ZAP centralized real-time control over multiple physical communication paths with every client. Real-time digital communication between the ZAP and antennas allows the ZAP to synchronously control each antenna's transmission and reception time slot, power, and sub-frequency. The ZAP is thus able to command simultaneous separate or overlapping communication on all of its antennas. Communication between multiple ZAPs enables synchronization between adjacent ZAP antennas.

Figure 2:
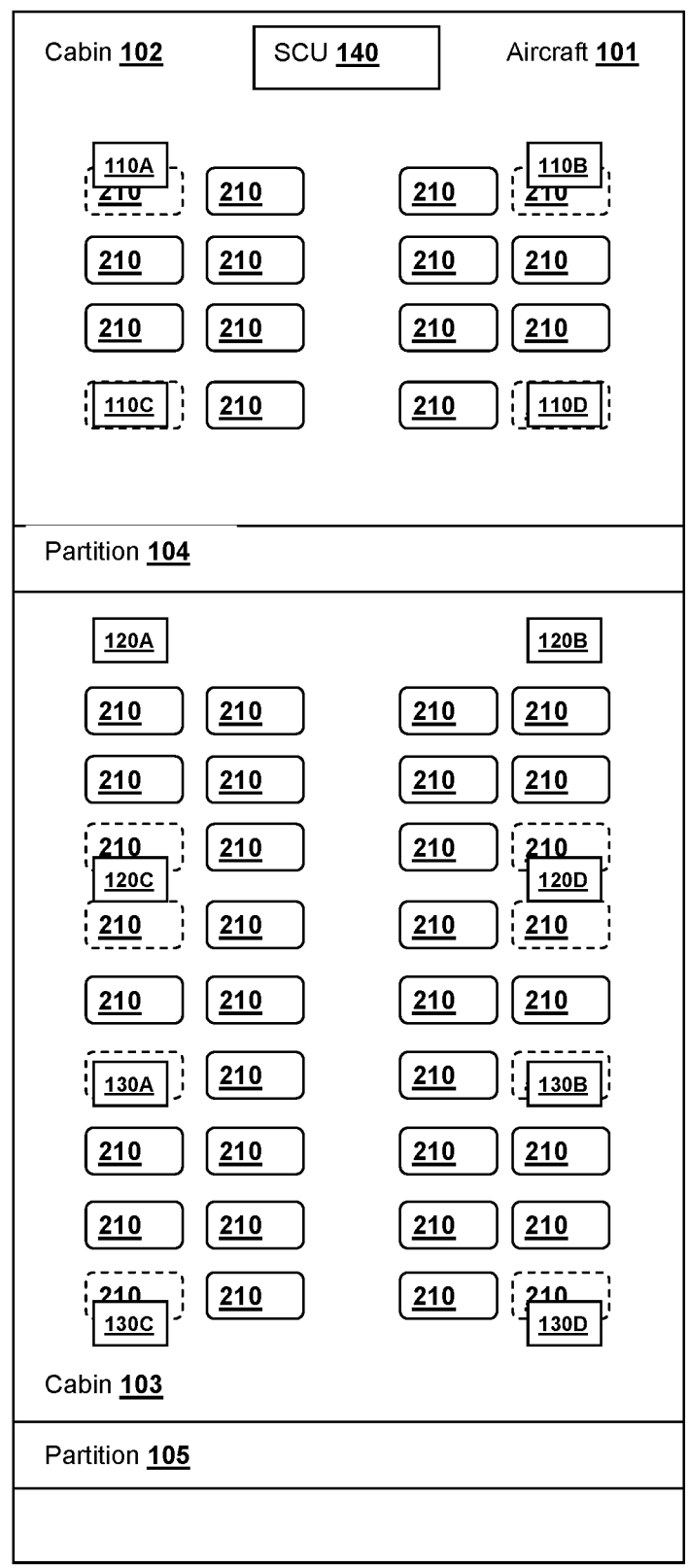
FIG. 2 provides the illustrative example of FIG. 1, showing a plurality of client devices within the system.

System 100 also includes a plurality of client devices 210, as shown in FIG. 2. FIG. 2 is the same system of FIG. 1, with ZAPs 110, 120, 130, SCU 140, and the illustrated wired connections removed from the figure for the purposes of illustrating client devices 210. Also, it should be noted that certain client devices 210 located under the antennas are shown in dotted lines for ease of illustration and clarity in the figure.

For clarity and simplicity, the discussion of the various details of the access point(s) of the inventive subject matter references ZAP 110 individually. However, it should be understood that, unless otherwise specifically noted or context dictates otherwise, the discussion of ZAP 110 similarly applies to ZAPs 120, 130.

Similarly, for clarity and simplicity, the discussion of the various details of the antenna(s) of the inventive subject matter references antenna 110A individually. However, it should be understood that, unless otherwise specifically noted or context dictates otherwise, the discussion of antenna 110A similarly applies to antennas 110B-110D, 120A-120D, and 130A-130D.

As will be discussed in further detail herein, ZAPs 110 exchange data wirelessly with clients 210 via the ZAPs' antennas 110A using a configurable frequency band transmission. In preferred embodiments of the inventive subject matter, the data exchange is performed within the 57-66 GHz frequency range, and more preferably within the 61.56 to 62.9 GHz ISM band.

The ZAPs 110 and antennas 110A are installed overhead in aircraft 101. In preferred embodiments, the antennas 110A are positioned no more than 20 meters from their corresponding ZAP 110. The antennas 110A can be arranged within the aircraft 101 depending on factors such as the transmission range of the antennas, the amount of antennas used, the dimensions and shape of the aircraft interior, the location of the antennas on clients 210, and other factors. In embodiments, the antennas are spaced along the length of the aircraft in about 10 meter increments. In embodiments, the antennas can be spaced along the width of the aircraft 101 at about the same increments, or at different distances than the spacing used in the length of the aircraft 101. For example, the antennas may be spaced at the 10 meter increments along the length of the aircraft 101, but at 3 meter increments along the width of the aircraft. Preferably, the antennas 110A are placed no closer than 2 meters apart. For the purposes of discussing the illustrative example herein, the antennas 110A are assumed to have a broadcast range of approximately 10 meters.

ZAPs 110 are the managed Ethernet switches between their wirelessly connected clients 210 and data (content and otherwise) provided by the SCU 140 via the GigE interface. ZAP 110 comprises at least one processor programmed to perform the functions described herein, and the data exchange interfaces enabling it to exchange data with other system components and other computing devices within aircraft 101 as described here. ZAP 110 also includes at least one non-transitory computer-readable storage medium that stores computer-executable instructions that are carried out by the ZAP's processor to execute its corresponding functions. In embodiments, the storage medium can also be used to store partial and/or complete copies of the content store by SCU 140, such that it is available for streaming to clients 210 without having to retrieve it from SCU 140.

Antenna 110A is an antenna capable of transmitting and receiving radio frequency ("RF") signals. Preferably, antenna 110A is configured to radiate and receive RF signals in the extremely high frequency ("EHF") range and, in particular, within the 57-66 GHz frequency range (also referred to herein as the "60 GHz spectrum"). More preferably, antenna 110A is configured to operate within the 61.56 to 62.9 GHz ISM band.

The aircraft 101 of FIG. 1 is divided into cabins 102 and 103 by partitions 104 and 105. The cabins 102, 103 are sections of the aircraft as subdivided by the partitions 104 and 105 (as well as the front and rear ends of the aircraft). Partitions 104, 105 can be galleys, lavatories, curtains, or other physical divisions between the various cabin sections of the aircraft 101. The partitions 104, 105 can be the physical divisions that define the boundaries of particular cabin seating classes (thus, beyond partition 105 there may be additional cabins, not shown). For example, in a particular aircraft 101, cabin 102 may be a first-class cabin and cabin 103 may be a "main cabin" (i.e., economy or "coach"). However, it should be noted that for certain aircraft configurations, a partition may be within a same seating class (i.e., a lavatory in the middle of economy class), thus dividing a seating class into two cabins.

ZAPs 110, 120, 130 are communicatively connected to one or more system control units ("SCU") 140 of aircraft 101, such as via a GigE interface. SCU 140 can be one or more computing devices installed in aircraft 101 from which the ZAPs obtain content for transmission, operation instructions, updates, etc. and to which ZAPs can send content requests, reporting information for the purposes of maintenance, troubleshooting, and general usage reporting. The SCUs 140 can include one or more processors and storage media (e.g., hard drives, solid-state drives, etc.). The SCUs 140, either individually or collectively (in configurations where more than one is present) store content in memory such as audio, video (e.g., movies, television programs, pre-recorded cabin announcements, etc.), interactive games, and other in-flight entertainment content. The SCUs 140 can also include communication interfaces that allow the SCU 140 to send and receive data to other aircraft systems (e.g., positioning data for passenger-accessible map functions, etc.) and other computing devices external to the aircraft (e.g., to update available content, report maintenance needs, usage data to appropriate parties, etc.)

Client device 210 includes an antenna and a processor programmed to carry out the functions of the client as described herein. The antenna of the client 210 is an antenna capable of transmitting and receiving radio frequency ("RF") signal, and preferably configured to radiate and receive RF signals in the extremely high frequency ("EHF") range and, in particular, within the 57-66 GHz frequency range (also referred to herein as the "60 GHz spectrum"). More preferably, antenna is configured to operate within the 61.56 to 62.9 GHz ISM band. It should be noted that the antenna of client 210 is configured to operate in the same frequency band as the antennas 110A.

The client device 210 can be connected to or integrated within an in-flight entertainment unit ("IFE") installed within (i.e., the seat-back and/or below) a seat of aircraft 101. The IFE typically includes a processor, a display unit, and an audio output interface (e.g., headphones jack, speaker, or other output), and can include a control interface (e.g., touch screen, remote control, controls in the arm-rest, etc.) or otherwise be connected to a control interface (e.g., controls in arm-rest or remote) that allows a user to interact with the IFE. In embodiments, the IFE can include one or more wireless network interfaces that enables the IFE to exchange data via cellular, WiFi and/or Bluetooth protocols as is known in the art.

Each client device 210 is assigned a MAC address by is corresponding ZAP 110. The client device 210 can provide a bridging function to various components of the IFE individually that lack Ethernet connectivity (e.g., the display unit, storage local to the IFE, etc.) and other aircraft systems (e.g., flight attendant call, seat controls, seat actuators, etc.).

In embodiments, the ZAPs 110 can learn the locations of the clients 210 by sensing, via one or more of their respective antennas 110A, the wireless transmissions from each client 210 installed in the aircraft. Thus the location can be determined via triangulation or other electronic location determination techniques. If a particular client 210 is replaced, or an aircraft's seating configuration changes, the location of one or more of the client devices 210 may change relative to the ZAP antennas 110A of the one or more ZAPs 110 on board the aircraft 101. The ZAPs 110 can then update their information regarding the locations of any clients 210 whose location have changed. The assignments of the clients 210 to each ZAP 110 (and, optionally, to one or more specific ZAP antennas) can be performed by the ZAPs 110 based on the detected quality of signal during the location discovery process.

Client 210 is programmed to configure (upon initial installation) and update its software as well the software of its associated IFE via wireless transmission from its ZAP. Relevant updated can be pushed to the ZAPs 110 via SCU 140. Thus, any updates to the client 210 or to its associated IFE can be performed without any configuration action needed by any aircraft mechanics or other personnel. Additionally, in embodiments, each client 210 can be programmed to, upon startup, reset, or periodically, provide configuration information (e.g., software version numbers, hardware information, etc.) to the ZAPs, who in turn can request the necessary updates from the manufacturer or other source via the SCU 140.

Each client device 210 is assigned to a particular ZAP 110 based on its location relative to one or more of ZAP's antenna(s), and can be associated with a secondary ZAP 110 for redundancy. The secondary ZAP 110 is selected based on the location of its antennas, such that at least one antenna 110A of the secondary ZAP 110 within transmission range of the particular client 210. Thus, in preferred embodiments, the secondary ZAP 110 is adjacent to the primary ZAP 110 for a particular client. In embodiments, a client device 210 can be assigned one or more specific antennas 110A associated with its assigned ZAP 110 as the default antenna(s) to use during operation. For example, a particular client device 210 can be assigned a primary antenna and a secondary antenna of a particular ZAP. In other embodiments, the client device 210 can dynamically select the best antenna on its assigned ZAP 110 based on detected antenna signal strength and/or the measured transmission speeds from the antennas. When a client device 210 selects an antenna (or changes the selected antenna), it transmits its selection to its assigned ZAP 110 informing the ZAP 110 which antenna it wishes to use for transmission. Having established a corresponding antenna (either assigned or selected), the client device 210 discards all messages that are not from that antenna.

Upon power up or reset, each client 210 is programmed to attempt communication with its primary ZAP 110. If the client 210 is unable to establish communication (e.g. within a certain time period, certain number of attempts, or other threshold), the client 210 is programmed to attempt to connect to the secondary ZAP if the primary ZAP is still not present.

During operation, the position of each client device 210 is fixed within aircraft 101 during operation of the system 100, and as such each ZAP 110 knows the location of its own antennas 110A and each client device 210 assigned to it.

In embodiments, aircraft configuration data ("ACD") that includes a pre-defined layout or map of the arrangement of client devices 210 within the aircraft 101 is loaded into each ZAP 110 with the client assignments for each ZAP 110. The ACD also includes data regarding the seat numbers, seat groups, IFE configuration data, and the name of the configuration that matches the aircraft's certified configuration. The layout can be uploaded into aircraft 101 via the SCU 140, which then provides it to the ZAPs 110. Thus, if the location of one or more of the client devices 210 changes (e.g., due to the removal or addition of a client due to maintenance, a change in the cabin configuration of the aircraft, etc.), an updated map must be provided to account for the new client arrangement within the aircraft.

In embodiments, a combination of ACD and the location discovery embodiments is used to provide ZAPs 110 with the location of the clients 210 within the aircraft. Having the layout provided by the ACD, the ZAPs 110 can electronically verify that the locations of the clients 210 match the configuration provided by the ACD, determine the seat numbers/groups associated with each client 210, and transmit any necessary IFE configuration information or updates to the appropriate client 210 for execution.

As discussed above, the ZAPs 110 (via antennas 110A) and clients 210 exchange data using a fixed frequency in the 60 GHz spectrum (preferably between 61.56-62.9 GHz). In order to successfully transmit data between the various antennas 110A and clients 210 within the cabins of aircraft 101 without interfering with each other, each of the ZAPs 110, 120, 130 are programmed to employ time division multiplexing to cause each of their respective antennas 110A-110D, 120A-120D, and 130A-130D to transmit according to fixed time slot assignments based on a predetermined schedule and transmission direction for each antenna. In order to be able to have multiple ZAPs transmit according to a uniform schedule, ZAPs 110, 120, 130 are synchronized in time.

Figure 3A:
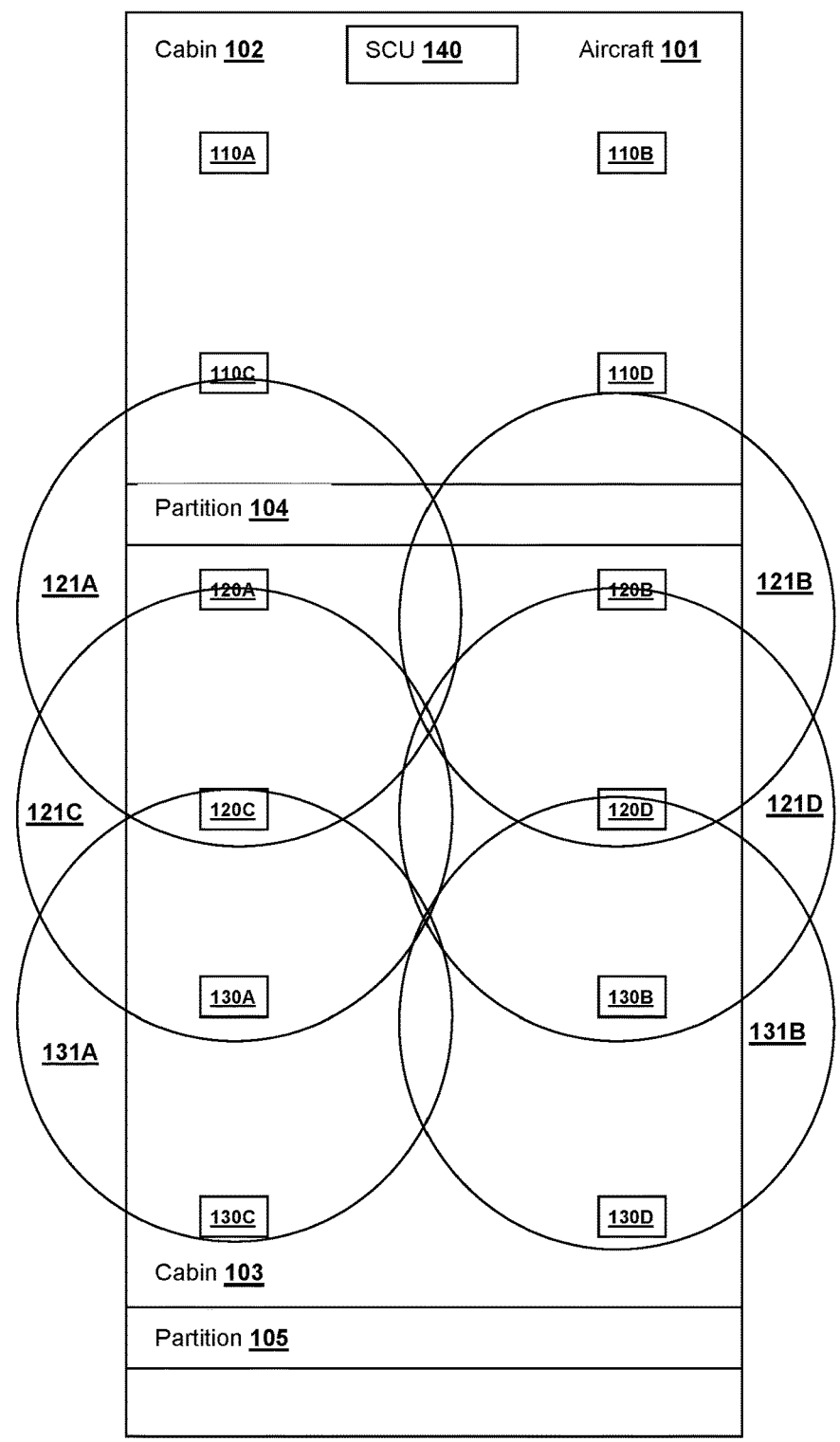
FIG. 3A provides an overview of the coverage area of a plurality of transmissions from a plurality of antennas, if the antennas were to transmit simultaneously.

FIG. 3A shows an illustrative example of transmissions 121A, 121B, 121C, 121D, 131A and 131B from antennas 120A, 120B, 120C, 120D, 130A, and 130B, respectively, if all were to be transmitting simultaneously. It should be noted that the circles representing the transmissions 121A, 121B, 121C, 121D, 131A and 131B are for illustrative purposes, and are not intended to be to scale.

The discussion of the inventive subject matter herein includes references to "adjacent" and "non-adjacent" antennas. As used herein, "adjacent" is intended to generally refer to two or more antennas 110A that are logically, physically, and/or geometrically proximate such that their transmission range of one of the antennas is within the transmission range of another antenna. Thus, it is possible that two adjacent antennas 110A are physically located far enough apart that the ranges of each antenna's transmissions do not reach the adjacent antennas themselves (even if pointed directly at the adjacent antenna), but that the transmission ranges of the antennas are such that the transmissions would intersect (and thus cause interference) if the adjacent antennas transmitted simultaneously.

Figure 3B:
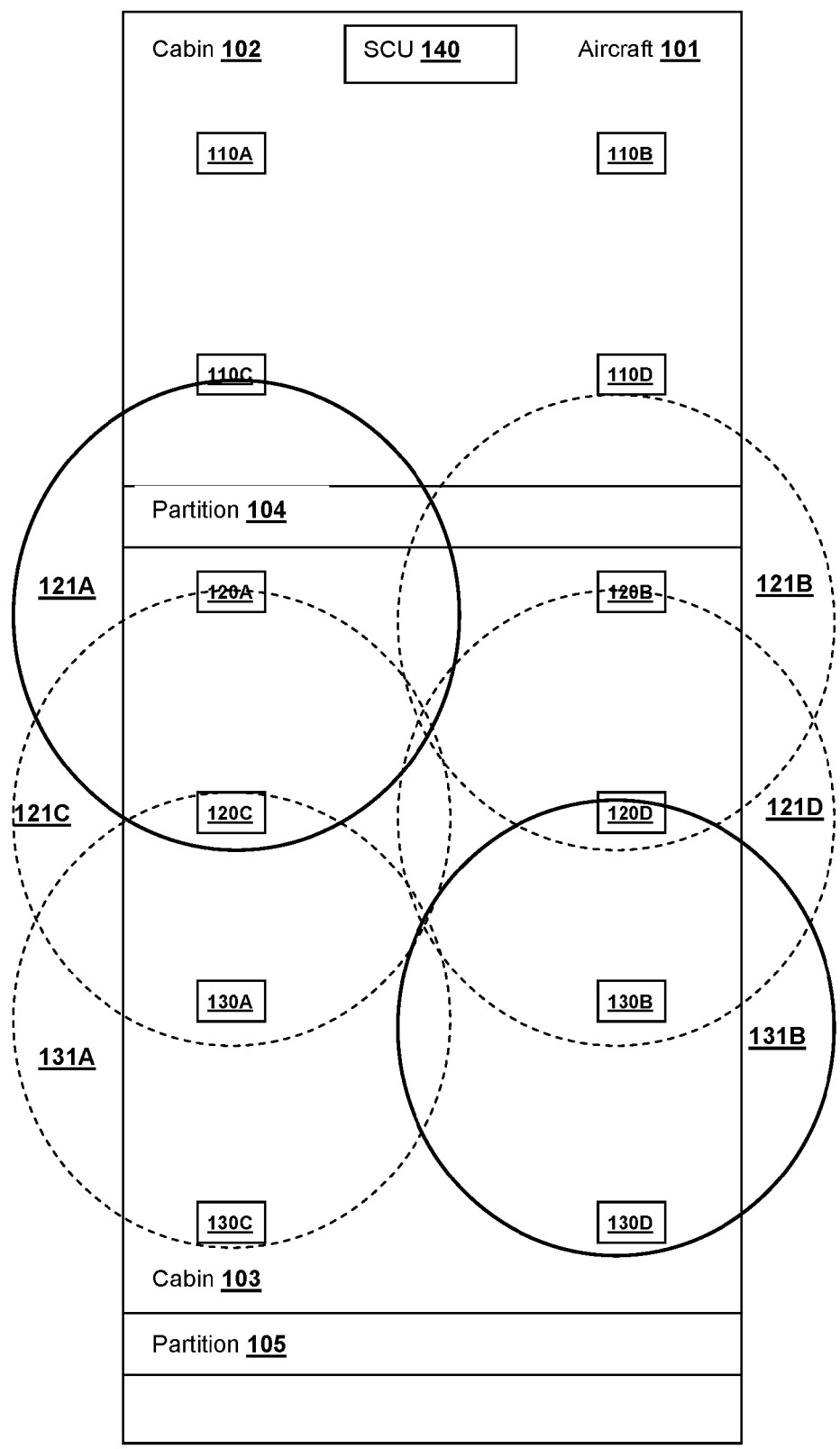
FIG. 3B provides the overview of FIG. 3A, highlighting examples of adjacent antennas and non-adjacent antennas.

For example, in FIG. 3A, antennas 120B, 120C and 120D are adjacent to antenna 120A because the transmission 121A of antenna 120A would intersect (and thus, interfere) with each of the transmissions 121B, 121C and 121D of antennas 120B, 120C, and 120D, respectively, if the transmissions occurred simultaneously. Conversely, antenna 130B is not considered adjacent to antenna 120A because the transmission 121A and the transmission 131B would not intersect even if the transmissions occurred simultaneously. FIG. 3B shows the transmissions of FIG. 3A, with the transmissions considered adjacent to transmission 121A in broken lines and the non-adjacent transmissions (121A and 131B) in solid lines.

It should be noted that, even though the transmissions of antennas 110C and 110D are not shown, antennas 110C and 110D would be considered adjacent to 120A if their respective transmissions could interfere with transmission 121A during a simultaneous transmission as discussed above. However, depending on the width of partition 104, the separation between the cabins 102 and 103 could be sufficient to keep the transmission 121A out of the range of the transmissions of one or both antennas 110C and 110D. Similarly, the partition 104 may be of a width and/or material such that partition 104 serves to insulate transmission 121A from those of antennas 110C and/or 110D, and vice-versa. In these cases, antenna 120A would not be considered adjacent to antenna 110C and/or 110D.

Figure 4A:
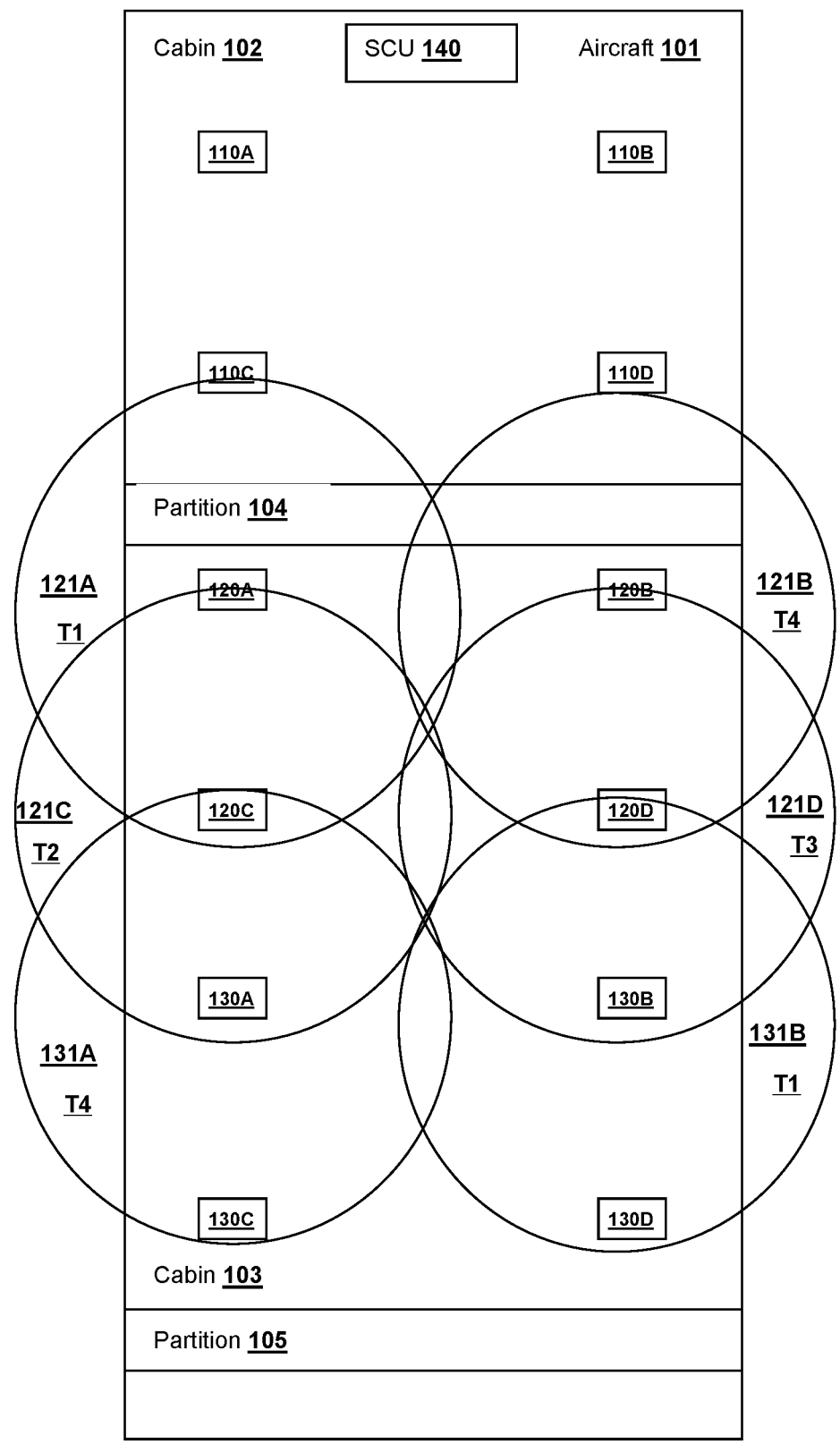
FIG. 4A provides an overview of the assigned time slots for each transmission from each antenna.

In order to avoid interference between transmissions of adjacent antennas, the ZAPs assign fixed broadcast time slots to each antenna. The ZAPs are synchronized such that if an antenna from a first ZAP (for example, antenna 120C of ZAP 120) is adjacent to an antenna from a second ZAP (antenna 130A of ZAP 130), the antennas can be assigned to time slots to avoid interfering with antennas of other ZAPs. FIG. 4A shows the transmissions 121A, 121B, 121C, 121D, 131A and 131B from antennas 120A, 120B, 120C, 120D, 130A, and 130B assigned time slots T1, T2, T3, T4, T1 and T2, respectively.

Table 1 depicts the fixed time slots T1-T4 assigned to the antennas (and their corresponding ZAP) as follows:

TABLE 1

| Antenna (ZAP) | Time Slot T1 | T2 | T3 | T4 | T1 | ... |
|---|---|---|---|---|---|---|
| 120A (120) | Transmits | OFF | OFF | OFF | Transmits | |
| 120C (120) | OFF | Transmits | OFF | OFF | OFF | |
| 120D (120) | OFF | OFF | Transmits | OFF | OFF | |
| 120B (120) | OFF | OFF | OFF | Transmits | OFF | |
| 130A (130) | OFF | OFF | OFF | Transmits | OFF | |
| 130C (130) | OFF | OFF | Transmits | OFF | OFF | |
| 130D (130) | OFF | Transmits | OFF | OFF | OFF | |
| 130B (130) | Transmits | OFF | OFF | OFF | Transmits | |

Figure 4B:
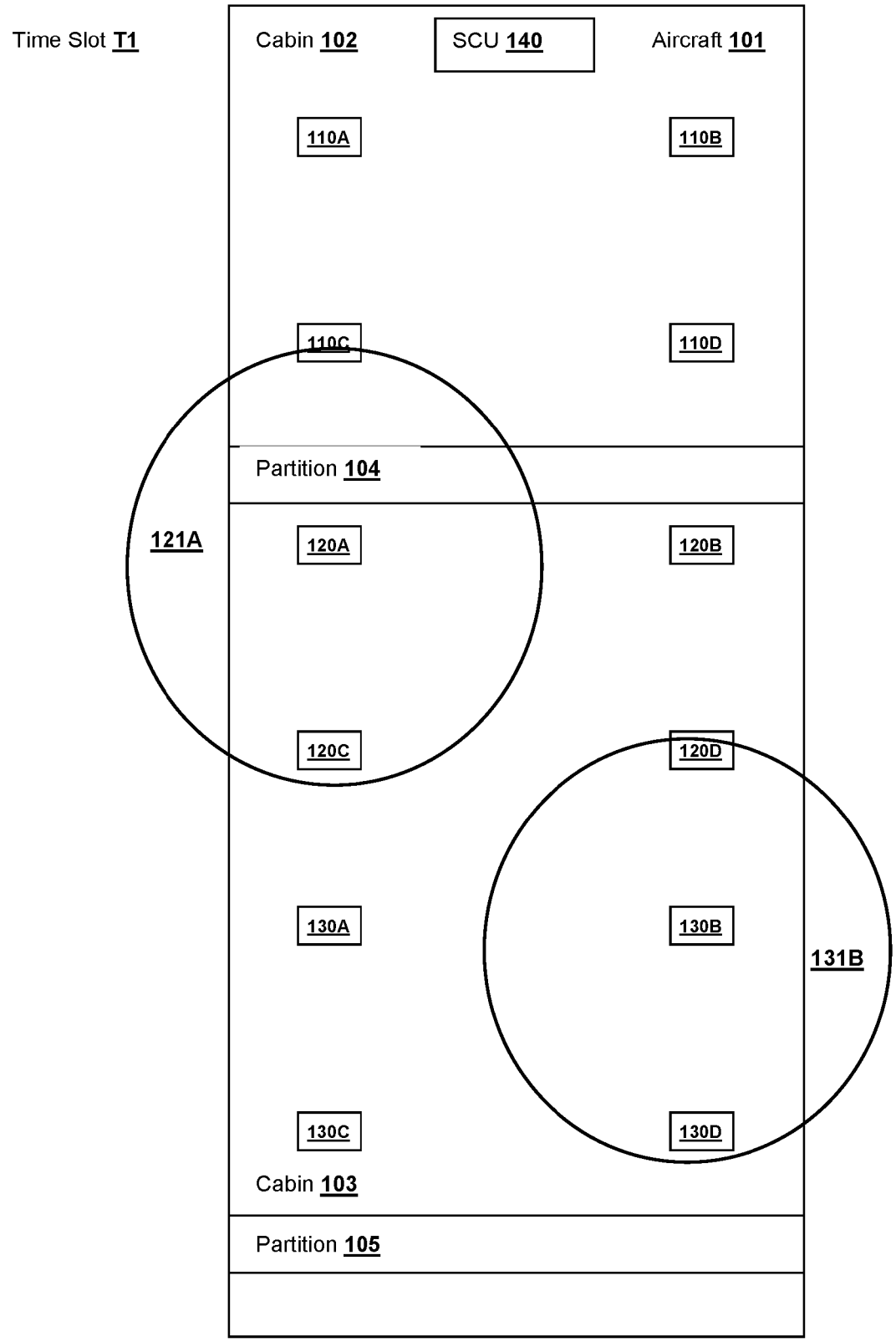
FIG. 4B shows the transmission of non-adjacent antennas transmitting during their assigned time slot and adjacent antennas silent during the same time slot.

The time slots T1, T2, T3, T4, T1 and T2 have been assigned to non-adjacent antennas to avoid interference when multiple antennas (from the same ZAP or, as in this example multiple ZAPs-ZAPs 120 and 130) are transmitting. FIG. 4B provides an illustration of the transmission activity at time slot T1, showing both antennas 120A and 130B transmitting, and adjacent antennas 120B, 120C, 120D, 130A, 130C and 130D (each adjacent to one or both of antennas 120A and 130B) silent.

The transmissions from antennas 130C, 130D are not shown, but for the purposes of this example are considered to be of approximately identical magnitude as the respective 121A, 121B, 121C, 121D, 131A and 131B. For the purposes of the illustrative example, antennas 130C, 130D could be transmitting to client devices 210 near the rear of the aircraft or into another cabin further rearward (not shown).

Thus, as shown by the time slot assignments in Table 1 applied in FIG. 4A, no adjacent antennas transmit at the same time, minimizing the possibility of interference between any two antennas transmitting simultaneously.

For the sake of simplicity in the illustrated example, the presented schedule of Table 1 depicts four time slots T1-T4. Depending on the number and arrangement of the antennas 110A, the number of clients 210, the configuration of the cabin, the amount of obstructions present in the cabin, etc., the amount of time slots can be greater to account for a greater number of potential instances of interference.

If the groupings of the antennas 110A within aircraft 101 are such that there is a "break" in the chain of adjacent antennas, then the scheduling of the broadcast times do not have to be coordinated because there is no danger of interference from one group to another. This can occur due to the spacing of certain groupings of antennas 110A and/or due to the presence of an obstruction such as a partition. For example, if due to partition 104, no antenna from cabin 102 is considered adjacent to any antenna of cabin 103, then time slots for antennas 110A-110D of ZAP 110 can be scheduled independently of those in cabin 103. However, if at least one antenna from cabin 102 is adjacent to at least one antenna of cabin 103, then the ZAPs 110 and 120 (and also 130 in this example) are synchronized to ensure there is no cross-cabin interference due to the adjacent antennas. Thus, if in FIGS. 3A-4B, it is assumed that antennas 110A, 110C and 110D are adjacent to antenna 120A but antenna 110B is not adjacent, antenna 110B would also be transmitting at time T1.

In embodiments, the time slot schedule for each antenna 110A can be provided a priori to the ZAPs 110, based on the known locations and transmission ranges of the antennas 110A within the system.

In embodiments, a ZAP 110 can be programmed to determine, for each antenna 110A, which other antennas 110A are adjacent and which are non-adjacent. In embodiments, the ZAP 110 can receive information regarding the location of each of the antennas 110A within aircraft 101 and the broadcast range for the antennas 110A, and determine which antennas are adjacent based on the distance between the antennas and their broadcast ranges. This information can be provided by a technician or other source of data, and can be data obtained from planned layouts and known specifications of the hardware components (e.g., the antennas). In embodiments, the ZAP 110 can determine the location of the antennas or the broadcast range by causing each antenna to transmit and then polling the clients 210 to see which clients received the broadcast and determining where the overlaps in broadcast range between the broadcasts of the various antennas 110A exist. In multiple ZAP environments, the ZAPs 110 can coordinate this process to determine, across an entire cabin or even an entire aircraft, the status of all of the antennas as adjacent or non-adjacent. This determination can be done upon initial system installation in aircraft 101, periodically (such as after maintenance where certain arrangements of the cabin could result in location changes for the antennas), or upon a change in antenna hardware or operating parameters (e.g., antennas changed to ones that have different transmission ranges).

In order to group antennas 110A into non-adjacent groups such that a particular time slot can be used by multiple antennas throughout the aircraft 101, the ZAP determines, for a first antenna 110A, which antenna(s) 110A are non-adjacent as discussed above. Then, the ZAP 110 determines the antennas 110A that are not adjacent for each of those antennas 110A not adjacent to the first antenna 110A, sequentially narrowing down the group to those antennas 110A that are commonly non-adjacent (i.e., none of the antennas 110A in the group are adjacent to any other antenna 110A in the group).

In these embodiments, the ZAP 110 can further be programmed to divide the transmission cycle based on the number of groups of non-adjacent antennas 110A.

For the sake of simplicity of illustration, the example of Table 1 and FIG. 4A depicts the fixed time slots for transmission by antennas to the clients 210. However, clients 210 can also communicate with their respective assigned ZAPs. Just as the transmissions from antennas 110A can cause interference with each other, so can the transmissions from clients 210 interfere with the transmissions from one or more antenna 110A. Thus, the fixed time slot schedule includes a time slot TC reserved for a client 210 to transmit data to their respective ZAP (via their selected antenna) as shown in Table 2. Because the client-ZAP transmission include far less data and are performed far less frequently than the ZAP-client transmission, the time slot reserved for client 210 transmissions can be scheduled to occur far less frequently. For example, it can occur every other cycle of the schedule (as in the example of Table 2), every third cycle, every $10^{th}$ cycle, etc.

TABLE 2

| Antenna (ZAP) | T1 | T2 | T3 | T4 | T1 | T2 | T3 | T4 | TC | ... |
|---|---|---|---|---|---|---|---|---|---|---|
| 120A (120) | Trans | OFF | OFF | OFF | Trans | OFF | OFF | OFF | OFF | |
| 120C (120) | OFF | Trans | OFF | OFF | OFF | Trans | OFF | OFF | OFF | |
| 120D (120) | OFF | OFF | Trans | OFF | OFF | OFF | Trans | OFF | OFF | |
| 120B (120) | OFF | OFF | OFF | Trans | OFF | OFF | OFF | Trans | OFF | |
| 130A (130) | OFF | OFF | OFF | Trans | OFF | OFF | OFF | Trans | OFF | |
| 130C (130) | OFF | OFF | Trans | OFF | OFF | OFF | Trans | OFF | OFF | |
| 130D (130) | OFF | Trans | OFF | OFF | OFF | Trans | OFF | OFF | OFF | |
| 130B (130) | Trans | OFF | OFF | OFF | Trans | OFF | OFF | OFF | OFF | |
| Client 210 | OFF | OFF | OFF | OFF | OFF | OFF | OFF | OFF | Trans | |

As with the antennas 110A as discussed above, simultaneous transmissions by adjacent clients 210 can similarly cause interference. The ZAPs 110 synchronize the TDMA slots so that adjacent clients 210 do not transmit at the same time. Because client-ZAP transmission are far less frequent and/or contain much less data than ZAP-client transmissions, the ZAPs 110 can, in embodiments, manage multiple client transmissions by splitting the client-assigned time slot TC into sub-slots, each assigned to a client needing to transmit. In other embodiments, the time slots TC can be assigned to a single client per cycle, with the clients 210 requiring transmission queued for transmission as time slots TC become available.

As discussed above, a client 210 can dynamically select which antenna on its assigned ZAP 110 it wishes to use. In order to "know" which antenna a client has selected, a ZAP 110 is programmed to listen for any transmission from any of its assigned clients 210 received from any of its antennas 110A.

The 60 GHz spectrum is particular susceptible to interference by environmental factors and objects. Thus, the transmission between a client 210 and a selected antenna might be disrupted or outright interrupted due to a blockage created by standing passengers, flight crew activity or carts in the aisles, open overhead compartments, or other obstacles present in the cabin. A client 210 is thus programmed to detect an interruption in a transmission from its selected antenna, and to select a new antenna to resume the transmission. The client 210 then notifies its assigned ZAP 110 of the change in antenna.

The client 210 is programmed to detect an interruption in a transmission by monitoring the received transmission from its current antenna and, if the data transmission rate from the antenna falls below an acceptable threshold (or, in embodiments, the client 210 stops receiving data altogether) from its current antenna for a predetermined amount of time.

Figure 5:
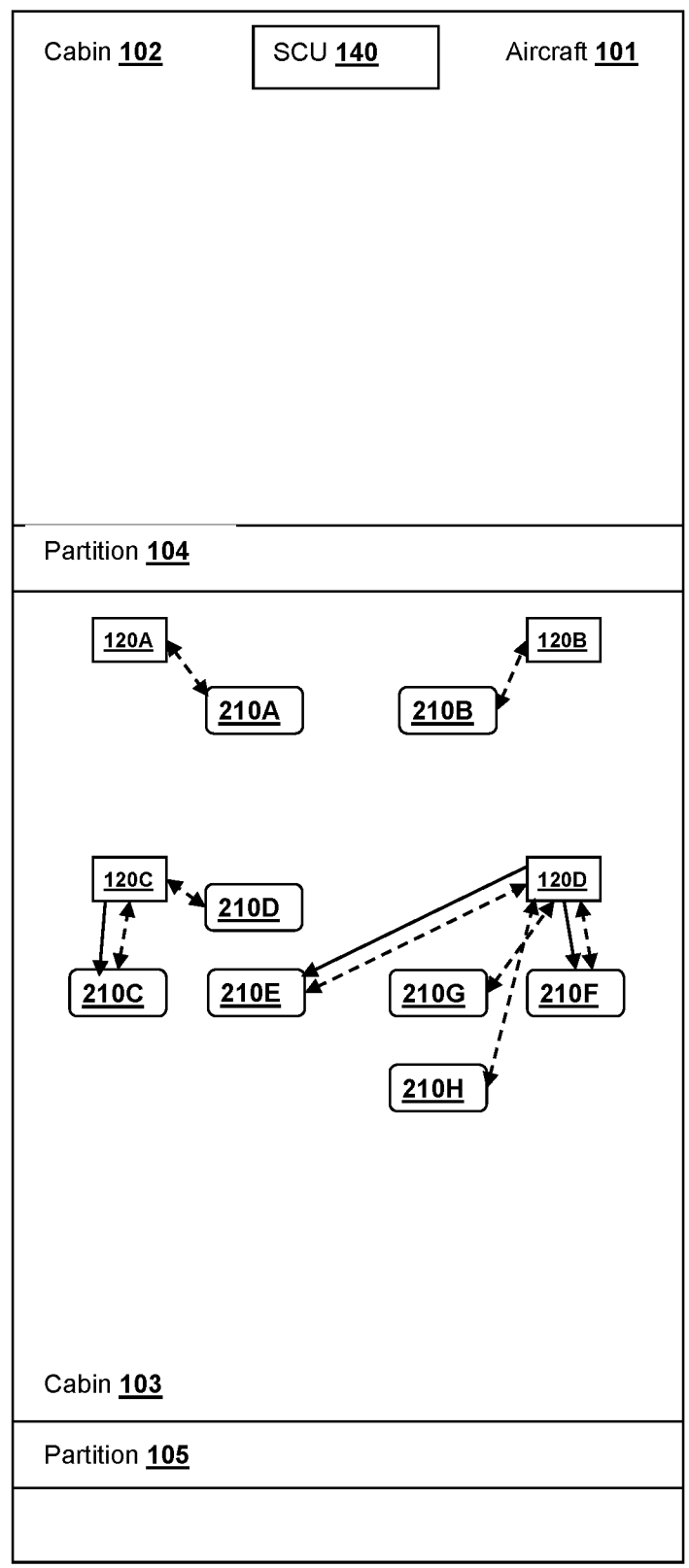
FIG. 5 provides an illustrative scenario of communications established between various clients according to an example implementation.

FIG. 5 provides an illustrative scenario of communications established between various clients in this example implementation. FIG. 5 shows a plurality of clients 210A-210G having established communications with ZAP 120 via antennas 120A-120D. For the purposes of clarity, ZAP 120 and other system components are not illustrated in FIG. 5. In FIG. 5, bidirectional communications are illustrated via the broken lines, and unidirectional communications are illustrated via solid lines.

As shown in FIG. 5, client 210A has selected antenna 120A for bidirectional communication, and client 210B has similarly selected antenna 120B. Antenna 120C has been selected for bidirectional communication by clients 210C and 210D, and is also downloading a movie in 92 seconds at 300 Mbps to client 210C. Antenna 120D, in turn, has been selected by four clients (210E, 210G, 210E, 210F) for bidirectional communication and is downloading two movies (one to client 210E and one to client 210F) at 300 Mpbs.

Thus, client 210A would be receiving data at time T1, client 210B would be receiving data at time slot T4, clients 210C and 210D at time T2, and clients 210E-210H at time T3. Additionally, the transmissions of data from the clients to their respective antennas are coordinated according to the time slots TC so as not to interfere with each other, as discussed above.

It should be noted that while the above discussion describes the system as applied within an aircraft, the system is similarly applicable to buses, trains, ships, submarines, or other high-capacity vehicles. Similarly, the system is also applicable in other high-occupancy, bandwidth-limited or bandwidth-regulated environments.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for wireless communication within a vehicle interior, comprising:
    a wireless access point ("ZAP") connected to a plurality of distinct and separate antennas including first, second, and third antennas arranged in different locations within a vehicle interior such that the first and second antennas, the second and third antennas, and the first and third antennas, are separated from one another by two or more meters, and wherein the first antenna is adjacent to the second antenna, and the second antenna is adjacent to the third antenna, and the first and third antennas are non-adjacent;
    wherein the wireless access point is programmed to cause the non-adjacent first and third antennas to transmit to a first plurality of client devices and a third plurality of client devices, respectively, according to a first time slot within a transmission cycle based on a location of the first and third antennas relative to the second antenna of the plurality of antennas;
    wherein the wireless access point is further programmed to cause the second antenna to transmit to a second plurality of client devices according to a second time slot within the transmission cycle based on a location of the second antenna relative to the first and second antennas of the plurality of antennas, wherein the first and second time slots do not overlap;
    wherein each of the first plurality of client devices includes a client antenna, and wherein each of the first plurality of client devices is associated with a primary antenna and a secondary antenna of the plurality of antennas based on locations of each of the devices and the antennas; and
    wherein the wireless access point is further configured to synchronously control each of the plurality of antennas including assigning a time slot associated with each antenna based on the location of the antenna relative to adjacent antennas of the plurality of antennas.

2. The system of claim 1, wherein the wireless access point is further configured to assign the first time slot to the first and third antennas by first determining whether a range of transmission for the first and third antennas overlaps a range of transmission of the second antenna or any of the other antennas of the plurality of antennas, and assigning a time slot for the first and third antennas that is different than any of the antennas for which there is an overlap.

3. The system of claim 2, wherein the wireless access point is further programmed to:
    determine that a transmission range of the second antenna does not overlap with the transmission range of the first and third antennas; and
    assign the second time slot to the second antenna such that the second antenna transmits to a second plurality of client devices during the second time slot and not the first time slot.

4. The system of claim 1, wherein the wireless access point is further programmed to:
    receive a predetermined layout of the anticipated location of each of the client devices relative to each antenna of the plurality of antennas;
    detect a signal transmitted by each of the client devices; and
    determine the relative location of each of the client devices relative to each antenna of the plurality of antennas based on the anticipated location and the signal.

5. The system of claim 1, wherein the antennas and the client antennas are configured to communicate using a fixed frequency band.

6. The system of claim 5, wherein the frequency band comprises the 61.56 to 62.9 GHz ISM band.

7. The system of claim 1, further comprising:
    a first client device from the first plurality of client devices, the first client device programmed to:
    receive a data transmission from the first antenna;
    determine that the data transmission has been interrupted;
    determine that the first client device is within a second broadcast range from the second antenna from the plurality of antennas; and
    transmit an antenna change request to the second antenna, the antenna change request indicating that the first client device wishes to switch to the second antenna; and
    the wireless access point further programmed to:
    receive the antenna change request; and
    in response to the antenna change request, resume the data transmission to the first client device via the second antenna.

8. The system of claim 1, wherein the wireless access point is further configured to locate each of the client devices using one or more of the plurality of antennas.

9. The system of claim 1, wherein the wireless access point is further configured to utilize time division multiplexing to cause each of the plurality of antennas to transmit according to an assigned time slot, and wherein the wireless access point is configured to assign each of the plurality of antennas one of the time slots based on the location of the antenna relative to the other antennas, such that adjacent antennas are assigned different time slots.

* * * * *